Figure 1:
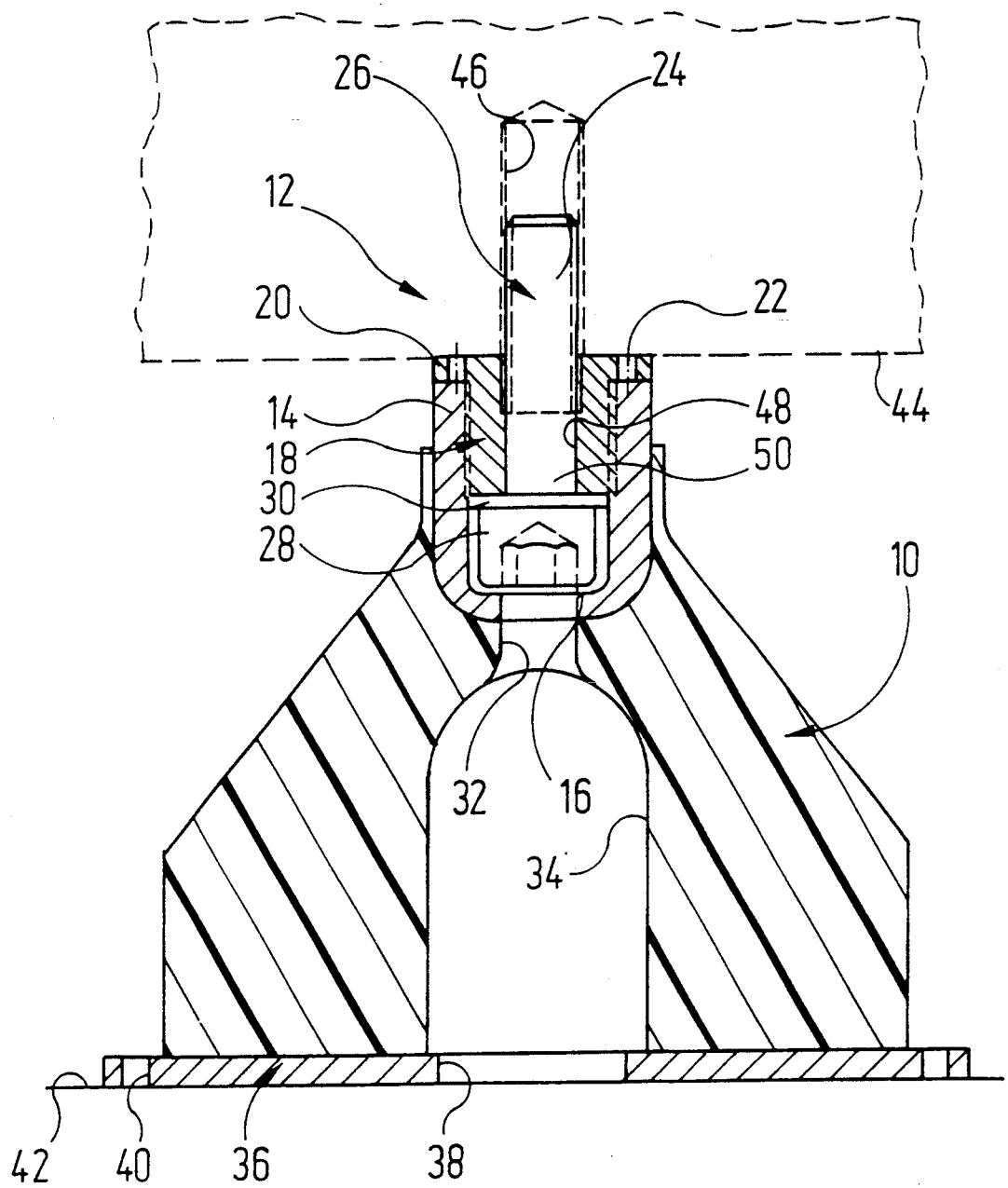

United States Patent [19]
Schaefer

[11] Patent Number: 5,318,282
[45] Date of Patent: Jun. 7, 1994

[54] VIBRATION DAMPER

[75] Inventor: Lothar Schaefer, Birenbach, Fed. Rep. of Germany

[73] Assignee: Stop-Choc Schwingungstechnik GmbH & Co., Penningen, Fed. Rep. of Germany

[21] Appl. No.: 895,137

[22] Filed: Jun. 8, 1992

[30] Foreign Application Priority Data

Jun. 14, 1991 [DE] Fed. Rep. of Germany ....... 4119605

[51] Int. Cl.⁵ ............................................. F16F 1/36
[52] U.S. Cl. ............................... 267/136; 267/141; 267/153
[58] Field of Search .............. 267/141, 140, 153, 136, 267/257, 258, 292, 293, 141.3, 141.2

[56] References Cited

U.S. PATENT DOCUMENTS

| | | | |
|---|---|---|---|
| 2,838,339 | 6/1958 | Schaldenbrand | 267/258 X |
| 3,948,500 | 4/1976 | Korbuly et al. | 267/140 |
| 4,641,855 | 2/1987 | Izumi | 267/258 X |
| 4,838,850 | 10/1974 | Chorkey | 267/141 |
| 4,869,479 | 9/1989 | Colonel et al. | 267/141 X |
| 4,871,150 | 10/1989 | Le Salver et al. | 267/141 X |
| 4,995,598 | 2/1991 | Ingham | 267/293 |
| 5,017,328 | 5/1991 | Mazurek | 267/141 X |

FOREIGN PATENT DOCUMENTS

| | | | |
|---|---|---|---|
| 1138185 | 6/1957 | France | 267/292 |
| 0045124 | 3/1986 | Japan | 267/141 |
| 1555429 | 11/1979 | United Kingdom | 267/141 |

*Primary Examiner*—Robert J. Oberleitner
*Assistant Examiner*—Peter M. Poon
*Attorney, Agent, or Firm*—Fred Philpitt

[57] ABSTRACT

In a vibration damper, a load-attachment unit carried by a spring member has an axially supported fixing screw with a threaded section pointing upwards, the head of the fixing screw being accessible by way of openings in a fastening part supporting the fixing screw, the spring member and a base plate from the underside of the vibration damper, so that the vibration damper may be located on those machine parts in which there is no possibility of access to the support point from above.

8 Claims, 2 Drawing Sheets

VIBRATION DAMPER

The invention relates to a vibration damper.

In known vibration dampers the spring member generally consists of a rubber material and the fastening part is a metal part, which is vulcanized directly into the rubber material of the spring member. The fastening part has a threaded bore for receiving a fixing screw, whereof the head acts on the load to be fastened to the vibration damper.

Now for some applications it would be desirable to have a vibration damper, which can also be provided on those loads where no possibility of access to a fixing screw can be provided.

To achieve this object, a vibration damper with the features described hereinafter constitute this invention.

In my vibration damper, the application of a tool for tightening the fixing screw may take place from the lower end of the vibration damper.

In a vibration damper according to another embodiment, the fixing screw is held undetachably in the downwards direction by the fastening part.

With the development of the invention according to another embodiment, it is ensured that the vibration damper can be used simultaneously for the equalization of small differences of position, but in addition the fixing screw is simultaneously mounted undetachably in the fastening part in the upwards direction. When the support sleeve is removed, the fixing screw may also be inserted simply in the fastening part.

In a vibration damper according to another embodiment, the fastening unit has no radial clearance, so that even transverse forces are transmitted directly to the spring member.

Figure 2:
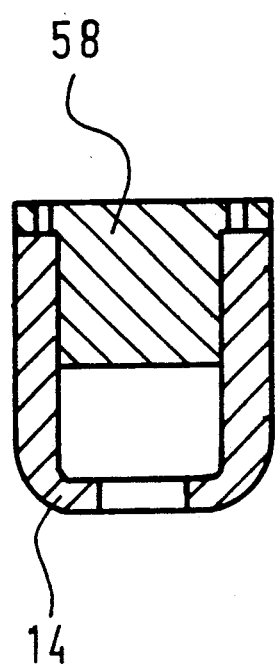

The invention will be described in detail hereafter with reference to the embodiment shown in the drawings. FIG. 1 which is a vertical axial section through a vibration damper wherein the fixing screw able to be actuated from the under side. FIG. 2 is a vertical axial section through a fastening part of the damper of FIG. 1 as prepared for the shaping of a rubber spring member of the damper.

The vibration damper illustrated in FIG. 1 has a spring member injected from resilient rubber material and designated generally by the reference numeral 10, which in the upper section is frustoconical, and in the lower section is cylindrical. A fastening unit designated generally by the reference numeral 12 is vulcanized in the tip of the upper section.

The fastening unit 12 comprises a cup-shaped fastening part 14 which is open at the top, which is provided in its peripheral wall with an internal thread and has a through hole 16 in its bottom wall.

Screwed into the fastening part 14 is a support sleeve 18 provided with an external thread, which sleeve includes a flange 20 engaging over the upper end face of the fastening part 14. The flanges 20 restricts the screwing-in movement of the support sleeve 18 and at the same time contains a plurality of openings 22 distributed in the peripheral direction for the application of an adjusting wrench containing corresponding sockets or in other words the flange 20 is provided on its end face with form-locking means 22 for the application of a tool.

Guided through the support sleeve 18 is a threaded section 24 of a fixing screw designated generally by the reference numeral 26. The head 28 thereof engages by way of a spring ring 30 against the lower end face of the support sleeve 18.

As an extension of the through hole 16, the spring member 10 comprises a through hole 32, which passes into a larger, cylindrical chamber 34.

Vulcanized on the lower end surface of the spring member 10 is a base plate 36, which is likewise provided with a central through hole 38. Provided in the edge section of the base plate 36 are openings 40, through which fixing screws for the secure attachment of the entire vibration damper to a locating surface 42 can be guided.

The reference numeral 44 diagrammatically represents a load, which is to be placed on the locating surface 42 in a vibration-free manner by way of the vibration damper. At the support points, the load 44 has respectively a threaded bore 46, into which the fixing screw 26 can be turned.

Since the turning of the fixing screw 26 can be effected by a hexagonal spanner inserted from below through the vibration damper, the vibration damper may also be attached to those loads in which the support points are poorly accessible from above.

By rotating the support sleeve 18, small irregularities in the levelling of the locating surface 42 can be equalized, so that the same conditions of elasticity are obtained at all the support points of the load.

A bearing section 50 of the fixing screw 26 has a sliding fit in the through hole of the support sleeve 18 designated by the reference numeral 48, so that even forces directed transversely with respect to the axis of the damper are introduced free from play into the spring member 10.

FIG. 2 shows the cup-shaped fastening part 14 at the time of shaping the rubber spring member 10 and at the time of vulcanization thereof. The upper end of the fastening part 14 is closed off by a plug 58 replacing the support sleeve 18.

A method for producing a vibration damper according to this invention can be achieved by embedding the fastening part (14) in a rubber material forming the spring member (10) and vulcanized on the latter, and the cup-shaped fastening part (14), which is open at its upper end, at the time of shaping of the spring member (10) and at the time of vulcanization thereof, is closed off by a plug replacing the support sleeve (18).

I claim:

1. A vibration damper for supporting loads which comprises
   (a) a deformable spring member (10) having a lower end which is adapted to be placed on a locating surface (42) and an upper end,
   (b) a fastening unit (12) supported in said upper end of said deformable spring member (10) and which is adapted to be connected by way of a threaded connection to a load (44), said fastening unit comprising
      (1) a fastening part (14) mounted in said spring member (10),
      (2) an axial bearing (18) mounted within said fastening part (14),
      (3) a fixing screw (26) mounted axially within said axial bearing (18) so as to be rotatable with respect to both said axial bearing (18) and said fastening part (14), an upper portion of said fixing screw (26) being threaded and a lower portion of said fixing screw (26) having a head (28), and (4) openings (16, 32, 34, 38) in said spring member (10) and fastening part (14) which provide access to the head (28) of said fixing screw (26) from said lower end of said spring member.

2. A vibration damper according to claim 1 wherein the diameter of an opening (16) provided in the fastening part (14) is smaller than the diameter of the head (28) of the fixing screw (26).

3. A vibration damper according to claim 1 wherein said axial bearing (18) comprises a support above which is adjustable within the fastening part (14) due to threaded engagement therebetween, which support sleeve cooperates with the head (28) of the fixing screw (26).

4. A vibration damper according to claim 3 wherein said support sleeve has an inner bore (48) which slidably cooperates with a bearing section (50) of the fixing screw (26).

5. A vibration damper according to claim 3 wherein a spring ring (30) is positioned between a lower end face of said support sleeve and the head (28) of the fixing screw (26).

6. A vibration damper according to claim 3 wherein said support sleeve includes a flange (20) engaging over the fastening part (14).

7. A vibration damper according to claim 6 wherein the flange (20) is provided on its end face with form-locking means (22) which are adapted to receive a tool.

8. Method for producing a vibration damper according to claim 1 in which the fastening part (14) is embedded in a rubber material forming the spring member (10) and is vulcanized on the latter, wherein the fastening part (14) is cup-shaped and fastening part (14), which is open at its upper end, at the time of shaping of the spring member (10) and at the time of vulcanization thereof, is closed off by a plug replacing the support sleeve (18).

* * * * *